April 27, 1965   D. G. BENNETT ETAL   3,180,742
ELEVATED TEMPERATURE RESISTANT CERAMIC STRUCTURAL ADHESIVES
Filed June 27, 1961
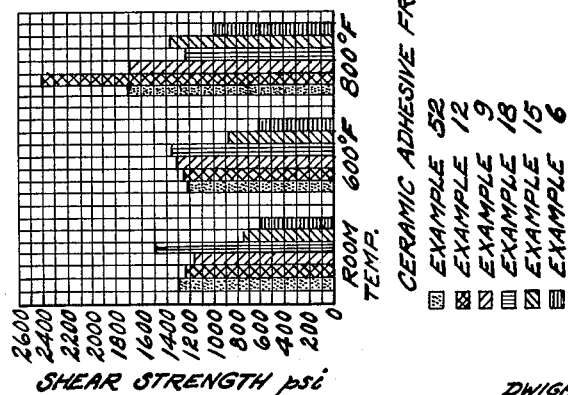
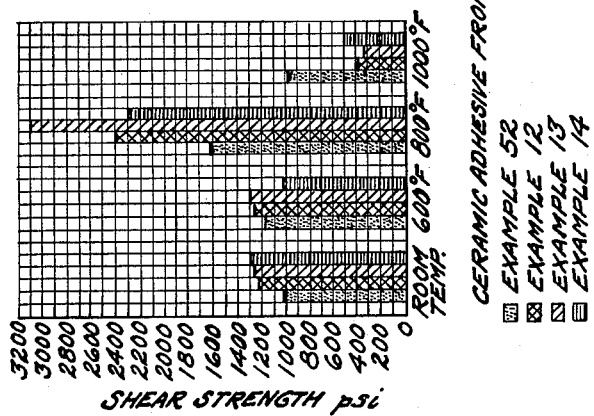
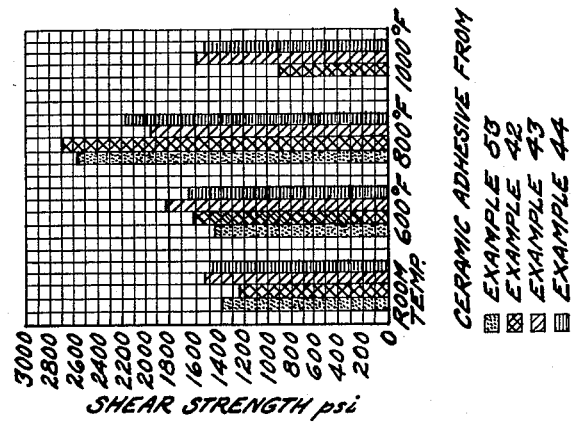
INVENTORS
DWIGHT G. BENNETT
RICHARD M. SPRIGGS
AND HENRY G. LeFORT
BY
ATTORNEYS

United States Patent Office 3,180,742
Patented Apr. 27, 1965

3,180,742
ELEVATED TEMPERATURE RESISTANT
CERAMIC STRUCTURAL ADHESIVES
Dwight G. Bennett, Champaign, Ill., Richard M. Spriggs, Reading, Mass., and Henry G. Lefort, Alamo, Calif., assignors to the United States of America as represented by the Secretary of the Air Force
Filed June 27, 1961, Ser. No. 120,099
25 Claims. (Cl. 106—48)

This invention relates to ceramic adhesives and to a method for their manufacture. In a more specific aspect, this invention relates to ceramic-oxide glassy-bonded adhesives characterized by a high degree of heat resistance.

The recent advent of high speed and high altitude aircraft and missiles has created a need for structural bonding materials capable of maintaining their strength and effectiveness at temperatures in the range of 1000° F. The high ambient temperatures encountered during the operation of high speed propulsion devices, as well as the severe stresses and strains imposed upon their integral components, produces an undesirable weakening effect in structural elements joined together by previously well-known bonding materials. The use of organic adhesives has proved unsuitable for elevated temperature applications because of their thermal and oxidative instability at temperatures above about 400° F. The refractory adhesives employed heretofore, although highly resistant to oxidative degradation, are limited in use because of their inherent brittleness, low impact resistance, poor thermal shock resistance, and relatively high maturing temperatures.

Accordingly, it is the primary object of this invention to circumvent the above-described limitations of the prior art by providing novel ceramic structural adhesives and a method for their manufacture.

Another object of this invention is to provide novel ceramic adhesives capable of maintaining their shear strength at elevated temperatures in the range of 1000° F.

Still another object of this invention is to provide novel ceramic adhesives that are particularly adapted for use in the bonding of structural components subjected to operational conditions of high temperature and severe stress.

A further object of this invention is to provide novel ceramic adhesives that exhibit good thermal shock and impact properties, resistance to moisture and low maturing temperatures.

The above and still further objects, advantages and features of this invention will become readily apparent upon consideration of the following detailed description thereof when taken in conjunction with the accompanying drawings, in which:

FIGURES 1, 2 and 3 are graphical representations disclosing shear strengths of the ceramic adhesives contemplated by this invention.

In accordance with this invention, it has been found that certain refractory ceramic frits of a range of composition to be disclosed in greater detail hereinafter, when combined with colloidal silica, water and fine particle metal powders produce novel ceramic adhesive compositions which are characterized by an unexpected strength at elevated temperatures. These ceramic adhesives are useful in bonding metal-to-metal, especially stainless steel and alloys of the stainless steel type. Of particular value is the utilization of these adhesives in forming bonded joints in the honeycomb sandwich type of panel construction used for aircraft and missiles.

The ceramic adhesives contemplated by this invention comprise a ceramic refractory frit, colloidal silica or clay, or some other suitable suspending agent, water and fine particle metal powders selected from the group consisting of aluminum, copper, carbonyl iron, carbonyl nickel and silicon. These ingredients are mixed together and milled to a very fine condition called a slip. The adhesive slip can then be directly applied to metallic components by dipping or spraying, allowed to dry, and then fired at an elevated temperature to develop the adhesive bond. In general, the adhesive slip comprises about 60 to 70 parts by weight of a ceramic frit, about 1 to 2 parts by weight of a suitable suspending agent, about 25 to 35 parts by weight of water, and about 5 to 20 parts by weight of metal powder.

The frit component of the ceramic adhesive of this invention is made by melting properly selected ceramic oxides, halides or metals into a glass by smelting the desired mixture in a suitable gas-fired smelter for a sufficient time and at a temperature until a smooth, pliable thread can be drawn from the melt. It is then quenched in water which shatters it and makes it easy to grind in the milling operation. The ground mixture is dried and ground to pass through a 40-mesh sieve. The frit is then ready for mixing with the suspending agent, water and metal powder. Selection of the first ingredients is based on the physical properties desired in the frit such as viscosity, thermal expansion, and strength. It was found that the thermal expansion of the adhesive should approach that of the metal in order to obtain high shear strengths. However, it may not be too near to the metal or crazing tendencies may reduce shear strength.

In order to illustrate specific embodiments of this invention, there are presented in Tables I through IV detailed examples of the ceramic adhesive slip, as well as the ceramic frit which forms a component part thereof. The ceramic frit composition may be incorporated into the adhesive slip as a unitary component, or a mixture of frits may be employed.

The composition of the glassy ceramic frits are in the range shown in Table I. Example 1 thereof discloses a range of composition for one type of frit while Example 2 discloses a different and more simple type of frit.

*Table I*

CERAMIC FRIT, PARTS BY WEIGHT

| Composition | Example | |
|---|---|---|
| | 1 | 2 |
| $SiO_2$ | 23–28 | 37–43 |
| $Al_2O_3$ | 10–15 | |
| $B_2O_3$ | 3–6 | 50–60 |
| $Na_2O$ | 10–20 | 3–7 |
| $K_2O$ | 3–6 | |
| $BaO$ | 4–7 | |
| $ZnO$ | 8–12 | |
| $CaO$ | 4–6 | |
| $Na_2SiF_6$ | 4–6 | |
| $P_2O_5$ | 1–5 | |
| $V_2O_5$ | 1–4 | |
| $Cr_2O_3$ | 0–5 | |
| $Fe_2O_3$ | 0–5 | |

*Table II*

CERAMIC FRIT, PARTS BY WEIGHT

| Composition | Example | | |
|---|---|---|---|
| | 3 | 4 | 5 |
| $SiO_2$ | 27.2 | 26.7 | 38.0 |
| $Na_2O$ | 16.3 | 16.0 | 5.0 |
| $B_2O_3$ | 4.0 | 3.9 | 57.0 |
| $Al_2O_3$ | 13.0 | 12.7 | |
| $K_2O$ | 5.1 | 5.0 | |
| $BaO$ | 6.0 | 5.9 | |
| $CaO$ | 5.4 | 5.3 | |
| $ZnO$ | 11.0 | 10.8 | |
| $Na_2SiF_6$ | 5.0 | 4.9 | |
| $P_2O_5$ | 4.0 | 3.9 | |
| $V_2O_5$ | 3.0 | 2.9 | |
| $Cr_2O_3$ | | 2.0 | |
| | 100.0 | 100.0 | 100.0 |

Table II above discloses detailed examples of the ceramic frits contemplated by this invention. The specific chemical ingredients and the amounts thereof come within the range of composition disclosed by Table I.

*Table III*

CERAMIC FRIT, PARTS BY WEIGHT

| Composition | Example | | |
|---|---|---|---|
| | 3A | 4A | 5A |
| Quartz | | 0.2 | 24.8 |
| $NaNO_3$ | 4.2 | 11.6 | 9.0 |
| Potash feldspar | 34.8 | 32.6 | |
| Borax | 9.2 | 8.6 | |
| Soda ash | 16.5 | 11.0 | |
| $H_3BO_3$ | | | 66.2 |
| $Cr_2O_3$ | | 1.6 | |
| $BaCO_3$ | 0.7 | 1.8 | |
| ZnO | 9.2 | 8.6 | |
| $CaCO_3$ | 8.0 | 7.3 | |
| $Na_2SiF_6$ | 4.2 | 3.9 | |
| $BaO \cdot P_2O_5$ | 6.9 | 6.5 | |
| $V_2O_5$ (88.5%) | 2.5 | 2.6 | |
| Aloxite [1] | 3.8 | 3.7 | |
| | 100.0 | 100.0 | 100.0 |

[1] $Al_2O_3$, dust collector fines.

The raw batch formula for the glassy frit for Examples 3, 4 and 5 respectively, of Table II are presented in Examples 3A, 4A and 5A respectively, of Table III above. The frits disclosed in Tables II and III are made by melting into a glass a selective mixture of various oxides and halides, then quenching the glass in cold water to shatter it, followed by a grinding operation. The frit mixture is then ready to be incorporated into the colloidal silica and water in order to produce a ceramic adhesive.

Specific examples of various ceramic adhesives formed in accordance with the teachings of this invention are presented in Table IV below. These examples comprise a mixture of the glasy frit from Examples 3, 4 and 5 respectively, as well as colloidal silica, water and metal powders in the amounts indicated. The ceramic adhesive mixture is milled, usually in a porcelain ball mill, to a very fine condition called a slip. The fineness of the slip is such that no more than 4 to 6 percent by weight of the residue is retained on a 200-mesh sieve. The adhesive slip can then be directly applied to metal pieces to be joined together, allowed to dry, and then fired at a temperature between 1000° F. and 2000° F. to develop an adhesive bond.

*Table IV*

CERAMIC ADHESIVE, PARTS BY WEIGHT [1]

| Adhesive example | Frit from— | | Syloid 244 [2] amt. | Water amt. | Metal powder | |
|---|---|---|---|---|---|---|
| | Exam. | Amt. | | | Kind | Amt. |
| 6 | 3 | 65.8 | 1.3 | 32.9 | Aluminum | 5 |
| 7 | 3 | 65.8 | 1.3 | 32.9 | do | 10 |
| 8 | 3 | 65.8 | 1.3 | 32.9 | do | 20 |
| 9 | 3 | 65.8 | 1.3 | 32.9 | Copper | 5 |
| 10 | 3 | 65.8 | 1.3 | 32.9 | do | 10 |
| 11 | 3 | 65.8 | 1.3 | 32.9 | do | 20 |
| 12 | 3 | 65.8 | 1.3 | 32.9 | Carbonyl iron | 5 |
| 13 | 3 | 65.8 | 1.3 | 32.9 | do | 10 |
| 14 | 3 | 65.8 | 1.3 | 32.9 | do | 20 |
| 15 | 3 | 65.8 | 1.3 | 32.9 | Carbonyl nickel | 5 |
| 16 | 3 | 65.8 | 1.3 | 32.9 | do | 10 |
| 17 | 3 | 65.8 | 1.3 | 32.9 | do | 20 |
| 18 | 3 | 65.8 | 1.3 | 32.9 | Silicon | 5 |
| 19 | 3 | 65.8 | 1.3 | 32.9 | do | 10 |
| 20 | 3 | 65.8 | 1.3 | 32.9 | do | 20 |
| 21 | 4 | 65.8 | 1.3 | 32.9 | Aluminum | 5 |
| 22 | 4 | 65.8 | 1.3 | 32.9 | do | 10 |
| 23 | 4 | 65.8 | 1.3 | 32.9 | do | 20 |
| 24 | 4 | 65.8 | 1.3 | 32.9 | Copper | 5 |
| 25 | 4 | 65.8 | 1.3 | 32.9 | do | 10 |
| 26 | 4 | 65.8 | 1.3 | 32.9 | do | 20 |
| 27 | 4 | 65.8 | 1.3 | 32.9 | Carbonyl iron | 5 |
| 28 | 4 | 65.8 | 1.3 | 32.9 | do | 10 |
| 29 | 4 | 65.8 | 1.3 | 32.9 | do | 20 |
| 30 | 4 | 65.8 | 1.3 | 32.9 | Carbonyl nickel | 5 |
| 31 | 4 | 56.8 | 1.3 | 32.9 | do | 10 |
| 32 | 4 | 65.8 | 1.3 | 32.9 | do | 20 |
| 33 | 4 | 65.8 | 1.3 | 32.9 | Silicon | 5 |
| 34 | 4 | 65.8 | 1.3 | 32.9 | do | 10 |
| 35 | 4 | 65.8 | 1.3 | 32.9 | do | 20 |
| 36 | 5 | 70.4 | 1.4 | 28.2 | Aluminum | 5 |
| 37 | 5 | 70.4 | 1.4 | 28.2 | do | 10 |
| 38 | 5 | 70.4 | 1.4 | 28.2 | do | 20 |
| 39 | 5 | 70.4 | 1.4 | 28.2 | Copper | 5 |
| 40 | 5 | 70.4 | 1.4 | 28.2 | do | 10 |
| 41 | 5 | 70.4 | 1.4 | 28.2 | do | 20 |
| 42 | 5 | 70.4 | 1.4 | 28.2 | Carbonyl iron | 5 |
| 43 | 5 | 70.4 | 1.4 | 28.2 | do | 10 |
| 44 | 5 | 70.4 | 1.4 | 28.2 | do | 20 |
| 45 | 5 | 70.4 | 1.4 | 28.2 | Carbonyl nickel | 5 |
| 46 | 5 | 70.4 | 1.4 | 28.2 | do | 10 |
| 47 | 5 | 70.4 | 1.4 | 28.2 | do | 20 |
| 48 | 5 | 70.4 | 1.4 | 28.2 | Silicon | 5 |
| 49 | 5 | 70.4 | 1.4 | 28.2 | do | 10 |
| 50 | 5 | 70.4 | 1.4 | 28.2 | do | 20 |
| 52 | 3 | 100 | 2.0 | 50 | | |
| 53 | 5 | 100 | 2.0 | 40 | | |

[1] All batches were milled to a trace on 200-mesh from a 100 gram sample.
[2] "Syloid" is a colloidal silica slip suspension agent.

Evaluation of the ceramic adhesives of this invention is set forth in Tables V and VI. Evaluation of the adhesives was accomplished by shear testing ceramic adhesive bonded test specimens in the range of room temperature to 1000° F. A Tinius Olsen super "L" type hydraulic testing machine and a split tube furnace were utilized for this purpose. The split tube furnace was employed to enclose the specimen when it was mounted in the testing machine for the purpose of determining shear strengths at elevated temperatures. The furnace was heated to the test temperature and held at that temperaure for 10 minutes in order that it might approach equilibrium. The test specimen was then loaded at 1200 pounds scale reading per minute until failure occurred. The breaking shear stress was doubled to get the shear strength in p.s.i. since the test area of each specimen was only one-half square inch.

A Rockwell "C" hardness tester equipped with a diamond penetrator (Brale) and using a major load of 150 kilograms was used to determine the Rockwell "C" hardness value of the various specimens evaluated for shear strength. Hardness values were obtained on specimens as received, after they had been subjected to various precipitation hardening treatments, and also after they had been tested in shear at 600° F. and 800° F. The Rockwell "C" hardness obtained on as received specimens referred to hereinafter as "condition A" was between 0 and 2.

Types 17–7PH and 302 stainless steel were used to make the test specimens employed in evaluating the ceramic adhesives. The results obtained are based on shear strength values of lap-joined specimens tested at various temperatures in the range of room and 1000° F. The shear test specimens were cut from stainless steel sheet stock as a thin rectangular section measuring 4¼ inches by 1 inch. Each section formed a specimen half and a ½ inch end area of each half was cleaned by sandblasting. The sandblasted end of each half was then coated by dipping in the adhesive to be tested, dried, and then the two coated ends were joined together so that a ½ inch overlap resulted. The lap-joined specimen, either singly or in a stack of multiple pieces, were then placed on a stainless steel firing rack. A static cure pressure of 50 p.s.i. was applied to the stack in a direction perpendicular to the individual planes of the overlapped coated ends by means of a suitable dead weight. The specimens were fired for about 20 minutes at about 1750° F. under the cure pressure so that the glassy adhesive particles in the ceramic adhesive softened and fused together, to the metal, and any screen carrier or similar carrier used directly in the adhesive material, thus forming a continuous glassy matrix phase. The specimens were then allowed to cool in place to room temperature. Specimens of type 302 stainless steel were then ready for shear strength testing but it was necessary to further heat treat 17–7PH stainless steel to precipitation harden it before shear strength testing. It was unexpectedly found that the ceramic adhesives of this invention are especially adapted for application during the heat hardening treatment of such steels since the maturing temperature of these adhesives fall within the specifications for the heat hardening treatment for type 17–7PH stainless steel.

Various heat hardening treatments were utilized in precipitation hardening the shear strength test specimens of type 17–7PH stainless steel. The stainless steel was obtained from the supplier in "condition A" which is mostly austenite, annealed at 1950° F. plus or minus 25° F. and air cooled. The specification for the first type of heat treatment, hereinatfer referred to as "condition B," comprises the steps of heating the metal to 1400° F. plus or minus 25° F. for 90 minutes, then cooling it to 60° F. within one hour after removal from the furnace. After cooling the metal was then hardened at 1050° F. plus or minus 10° F. for 90 minutes, followed by air cooling to room temperature. The second type of heat treatment, hereinafter referred to as "condition C," was similar in all respects to heat treatment "condition B," except that the specimen was hardened at 950° F. plus or minus 10° F. for 30 minutes followed by air cooling to room temperature. The third type of heat hardening treatment, hereinafter referred to as "condition D," comprises the steps of heating the metal to 1750° F. plus or minus 15° F. for 20 minutes, cooling to 60° F. within one hour after removal from the furnace, then cooling the metal to −100° F. and holding it at that temperature for eight hours. The metal was then hardened at 950° F. plus or minus 10° F. for one hour, followed by air cooling to room temperature. It is to be particularly noted that the first step in the "condition D," hardening treatment permits the application of the ceramic adhesive completely within the time temperature limits for that treatment.

In most instances, a screen carrier is embedded right in the adhesive bond but a carrier is not always essential for good shear strength. The screen carrier, if used, becomes an integral part of the adhesive joint and results in considerable improvement in shear strength over that achieved without the use of a carrier screen. A series of regular mesh stainless steel screens of varying mesh fineness and wire diameter, as well as a quartz microfiber paper, were utilized as carriers. A stainless steel carrier screen having a 1/32 inch space with a 4 mil wire diameter, designated as a 28-mesh space screen, acted to produce higher shear strengths than regular mesh stainless steel screen of a mesh fineness up to 400.

Referring to FIGURE 1 there is graphically disclosed the effects on shear strength produced by employing 5 parts by weight of a fine particle metal powder selected from the group consisting of aluminum, copper, silicon, carbonyl iron and carbonyl nickel. In general, carbonyl iron seems to produce the maximum effect on shear strength, especially at test temperatures of 800° F. The shear strength of a ceramic adhesive having the same composition, except for the addition of a metal powder, is included for comparison. Various amounts of carbonyl iron up to about 20 parts by weight were added to the adhesive slip and these results are presented in FIGURES 2 and 3. Carbonyl iron in an amount of about 10 parts by weight appear to be the most effective in increasing the shear strength up to 800° F. where a high value of more than 3000 p.s.i. was achieved. At the test temperature of 100° F. all of the additions of carbonyl iron tended to reduce the shear strength. However, an examination of FIGURE 2 will show that carbonyl iron acted to increase shear strength at temperatures up to 800° F. even in quantities as high as 20 parts by weight. An examination of FIGURE 3 discloses that additions of carbonyl iron did not greatly increase the shear strength at the test temperature of 600° F. However, these modifications, especially the 10 and 20 parts by weight additions, gave shear strengths in excess of 1500 p.s.i. at 1000° F. and gave even higher shear strengths at the test temperatures of 600° F. and 800° F. when compared with the test results exhibited at room temperature. The 10 and 20 parts by weight modifications disclosed a minimum variation in shear strength of from 1500 p.s.i. to 2200 p.s.i. over the test temperature range of room to 1000° F. The metal powder additions, however, did tend to decrease brittleness thereby improving impact and thermal shock resistance, as well as extending heat stability.

Table V below presents shear strength and Rockwell "C" hardness test values for some of the ceramic adhesives of this invention. The adhesives of Examples 42, 43 and 44 were designed to have a low maturing temperature in the range of 1300° F. to 1500° F., a high thermal expansion as close as practical to the expansion of type 17–7PH stainless steel, and to be sufficiently reactive with the metal to produce a strong adhesive bond. The test specimen ends of type 17–7PH stainless steel were sandblasted, dipped in the adhesive, dried for one hour at 200° F. and fired for 20 minutes at 1750° F. with a cure of 50 p.s.i. A 28-mesh stainless steel space screen carrier was employed. The test specimens were then given the remaining heat treatment necessary to obtain "condition D." Shear strength tests were conducted at room temperature, 600° F., 800° F. and in some instances at 1000° F. Rockwell "C" hardness values were determined before and after shear strength testing. The adhesives of Examples 43 and 44 gave relatively good shear strength values even when tested at 1000° F. However, the adhesive of Example 42 softened and pulled apart gradually with no sharp snap at values of 910 p.s.i. and 930 p.s.i. when tested at 1000° F. The other adhesive specimens tested broke with a definite snap at failure. It is believed that the $B_2O_3$ content of those adhesives extended the maturing range and, therefore, the test specimens were not overfired during the 20 minutes of heating at 1750° F. The adhesives of Examples 6, 9, 12, 15 and 18 were made up by adding 5 parts by weight of aluminum, copper, carbonyl iron, carbonyl nickel and silicon powders, respectively. The aluminum and nickel powder additions did not increase shear strengths to any great degree. However, the carbonyl iron powder additions produced shear strengths in excess of 1000 p.s.i. up through 800° F., but the shear strengths dropped off between 800° F. and 1000° F. The Rockwell "C" hardness values are fairly consistent for all specimens tested before and after shear except for those tested at 1000° F. which averaged about 5 points lower.

*Table V*

SHEAR STRENGTH AND ROCKWELL "C" HARDNESS OF CERAMIC ADHESIVES APPLIED ON TYPE 17-7PH STAINLESS STEEL HARDENED TO "CONDITION D" USING A 28-MESH STAINLESS STEEL SPACE SCREEN CARRIER

| Ceramic adhesive from exam. | Temp. of test, °F. | Adhesive thickness, mils. | Shear strength, p.s.i. | Rockwell "C" hardness No. | |
|---|---|---|---|---|---|
| | | | | Before test | After test |
| 42 | Room | 9 | 1,300 | 46 | 47 |
| 42 | Room | 8 | 1,280 | 46 | 47 |
| Average | | | 1,290 | | |
| 42 | 600 | 8 | 1,670 | 46 | 46 |
| 42 | 600 | 8 | 1,700 | 46 | 46 |
| Average | | | 1,685 | | |
| 42 | 800 | 7 | 1,680 | 46 | 47 |
| 42 | 800 | 9 | 1 2,710 | 46 | 47 |
| Average | | | 2,195 | | |
| 42 | 1,000 | 8 | 910 | 46 | 40 |
| 42 | 1,000 | 8 | 930 | 45 | 41 |
| Average | | | 920 | | |
| 43 | Room | 7 | 1,650 | 44 | 47 |
| 43 | Room | 8 | 1,500 | 46 | 47 |
| Average | | | 1,575 | | |
| 43 | 600 | 7 | 2,010 | 46 | 47 |
| 43 | 600 | 9 | 1,720 | 46 | 47 |
| Average | | | 1,865 | | |
| 43 | 800 | 9 | 1,860 | 45 | 46 |
| 43 | 800 | 9 | 2,120 | 46 | 47 |
| Average | | | 1,990 | | |
| 43 | 1,000 | 9 | 1,490 | 46 | 39 |
| 43 | 1,000 | 7 | 1,700 | 46 | 43 |
| Average | | | 1,595 | | |
| 44 | Room | 8 | 1,570 | 46 | 46 |
| 44 | Room | 8 | 1,440 | 46 | 46 |
| Average | | | 1,505 | | |
| 44 | 600 | 9 | 1,650 | 46 | 46 |
| 44 | 600 | 10 | 1,770 | 46 | 46 |
| Average | | | 1,710 | | |
| 44 | 800 | 9 | 2,350 | 46 | 46 |
| 44 | 800 | 9 | 2,040 | 46 | 47 |
| Average | | | 2,195 | | |

See footnote at end of table.

*Table V—Continued*

SHEAR STRENGTH AND ROCKWELL "C" HARDNESS OF CERAMIC ADHESIVES APPLIED ON TYPE 17-7PH STAINLESS STEEL HARDENED TO "CONDITION D" USING A 28-MESH STAINLESS STEEL SPACE SCREEN CARRIER

| Ceramic adhesive from exam. | Temp. of test, °F. | Adhesive thickness, mils. | Shear strength, p.s.i. | Rockwell "C" hardness No. | |
|---|---|---|---|---|---|
| | | | | Before test | After test |
| 44 | 1,000 | 10 | 1,630 | 46 | 40 |
| 44 | 1,000 | 9 | 1,480 | 45 | 41 |
| Average | | | 1,505 | | |
| 6 | Room | 26 | 520 | 46 | 46 |
| 6 | Room | 26 | 640 | 46 | 47 |
| Average | | | 580 | | |
| 6 | 600 | 26 | | 47 | |
| 6 | 600 | 21 | 610 | 46 | 47 |
| 6 | 800 | 24 | 950 | 46 | 47 |
| 6 | 800 | 24 | 1,000 | 46 | 47 |
| Average | | | 975 | | |
| 9 | Room | 8 | 1,090 | 45 | 47 |
| 9 | Room | 8 | 1,230 | 46 | 47 |
| Average | | | 1,160 | | |
| 9 | 600 | 9 | 1,330 | 46 | 46 |
| 9 | 600 | 7 | 1,280 | 44 | 45 |
| Average | | | 1,305 | | |
| 9 | 800 | 7 | 2,110 | 44 | 46 |
| 9 | 800 | 7 | 1,400 | 46 | 47 |
| Average | | | 1,775 | | |
| 12 | Room | 6 | 1,170 | 47 | 47 |
| 12 | Room | 5 | 1,330 | 47 | 47 |
| Average | | | 1,250 | | |
| 12 | 600 | 6 | 1,200 | 46 | 47 |
| 12 | 600 | 6 | 1,300 | 45 | 46 |
| Average | | | 1,250 | | |
| 12 | 800 | 5 | 3,160 | 47 | 46 |
| 12 | 800 | 5 | 1,680 | 46 | 47 |
| Average | | | 2,420 | | |
| 12 | 1,000 | 7 | 410 | 46 | 41 |
| 12 | 1,000 | 7 | 340 | 46 | 41 |
| Average | | | 375 | | |
| 15 | Room | 9 | 750 | 47 | 47 |
| 15 | Room | 8 | 840 | 47 | 47 |
| Average | | | 795 | | |
| 15 | 600 | 7 | 920 | 46 | 45 |
| 15 | 800 | 7 | 1,330 | 47 | 45 |
| 15 | 800 | 8 | 1,410 | 47 | 47 |
| Average | | | 1,370 | | |
| 18 | Room | 5 | 1,500 | 46 | 47 |
| 18 | Room | 5 | 1,530 | 47 | 46 |
| Average | | | 1,515 | | |
| 18 | 600 | 7 | 1,290 | 46 | 47 |
| 18 | 600 | 6 | 1,400 | 47 | 47 |
| Average | | | 1,345 | | |
| 18 | 800 | 7 | 1,430 | 47 | 48 |
| 18 | 800 | 8 | 1,030 | 48 | 47 |
| Average | | | 1,230 | | |
| 13 | Room | 8 | 1,290 | 45 | 45 |
| 13 | Room | 9 | 1,270 | 47 | 46 |
| Average | | | 1,280 | | |
| 13 | 600 | 7 | 1,300 | 45 | 48 |
| 13 | 600 | 8 | 1,230 | 46 | 48 |
| Average | | | 1,265 | | |
| 13 | 800 | 9 | 3,110 | 46 | 47 |
| 13 | 800 | 9 | 3,040 | 46 | 44 |
| Average | | | 3,075 | | |
| 13 | 1,000 | 8 | 340 | 45 | 40 |
| 13 | 1,000 | 9 | 310 | 46 | 40 |
| Average | | | 325 | | |

Table V—Continued
SHEAR STRENGTH AND ROCKWELL "C" HARDNESS OF CERAMIC ADHESIVES APPLIED ON TYPE 17-7PH STAINLESS STEEL HARDENED TO "CONDITION D" USING A 28-MESH STAINLESS STEEL SPACE SCREEN CARRIER

| Ceramic adhesive from exam. | Temp. of test, °F. | Adhesive thickness, mils. | Shear strength, p.s.i. | Rockwell "C" hardness No. | |
|---|---|---|---|---|---|
| | | | | Before test | After test |
| 14 | Room | 9 | 1,480 | 46 | 47 |
| 14 | Room | 9 | 1,170 | 45 | 46 |
| Average | | | 1,325 | | |
| 14 | 600 | 9 | 1,080 | 45 | 47 |
| 14 | 600 | 8 | 1,020 | 46 | 47 |
| Average | | | 1,025 | | |
| 14 | 800 | 10 | 3,080 | 47 | 47 |
| 14 | 800 | 10 | 2,530 | 47 | 48 |
| Average | | | 2,810 | | |
| 14 | 1,000 | 10 | 490 | 46 | 40 |
| 14 | 1,000 | 9 | 530 | 45 | 40 |
| Average | | | 510 | | |

[1] Specimen grips failed at 3,860 p.s.i. on first attempt to break this specimen.

Table VI below, sets forth shear strength tests for the ceramic adhesives of Examples 14 and 44 which contain 20 parts by weight of carbonyl iron, when applied on type 17-7PH stainless steel with and without the use of a carrier after immersion in boiling water for 100 hours. Also included is Example 51 which is a 50-50 blend of the adhesives of Examples 14 and 44. Type 17-7PH stainless steel test specimens were dipped in these adhesives, dried at 200° F. for one hour and then fired at 1750° F. for 20 minutes with a cure pressure of 50 p.s.i. The test specimens were hardened to "condition D" and after bonding with the adhesives were submerged in boiling tap water at 212° F. for 100 hours. These specimens, as well as two specimens bonded with each adhesive but not subjected to boiling water, were tested in shear at room temperature. The Rockwell "C" hardness was also determined. The adhesive of Example 14 decreased in shear strength by about 20 percent whether a 28-mesh stainless steel space screen was or was not used as a carrier. The adhesive of Example 51 decreased in shear strength by about 25 percent when no carrier was used. This same adhesive when using a screen carrier appeared not to be affected by the 100 hour boiling water test and the shear strength was increased somewhat. However, since the shear strengths of the remaining specimens decreased after immersion, it would seem that glassy type ceramic adhesives are affected to some degree by very severe moisture conditions such as immersion in boiling water.

It will be seen from the above test data that the present invention provides novel refractory ceramic adhesives that are especially resistant to elevated temperature and, in addition are capable of maintaining their resistance to high temperatures for extended periods of time. The ceramic adhesives of this invention can be successfully employed for bonding stainless steel and stainless steel alloys, and in particular, can be applied during the percipitation harden treatment necessary to harden type 17-7PH stainless steel. The unexpected increase in shear strength for bonded joints employing the adhesives of this invention has proved to be of special value when the adhesive is employed in bonding structural components that are subjected to the stress and elevated temperature conditions encountered during the operation of high performance jet and rocket aircraft.

Although the present invention has been described with particular reference to specific embodiments thereof, the invention is not to be considered as limited thereto, but includes within its scope such modifications and alterations as come within the appended claims.

Table VI
TEST RESULTS OBTAINED WITH CERAMIC ADHESIVES SUBJECTED TO 100 HOUR IMMERSION IN BOILING WATER

| Specimen No. | Adhesive from— | Immersed and control | Adhesive thickness, mils. | Shear strength, p.s.i. | Rockwell "C" hardness No. | |
|---|---|---|---|---|---|---|
| | | | | | Before test | After test |
| 1 [1] | 14 | Imm | 9 | 1,020 | 47 | 45 |
| 2 [1] | 14 | Cont | 9 | 1,250 | 46 | 44 |
| 3 | 14 | Imm | 5 | 860 | 44 | 44 |
| 4 | 14 | Imm | 7 | 920 | 45 | 45 |
| Average | | | | 890 | | |
| 5 | 14 | Cont | 4 | 1,120 | 46 | 45 |
| 6 | 14 | Cont | 5 | 1,070 | 46 | 44 |
| Average | | | | 1,095 | | |
| 7 [1] | 51 | Imm | 9 | 1,410 | 45 | 44 |
| 8 [1] | 51 | Cont | 9 | 1,370 | 45 | 44 |
| 9 | 51 | Imm | 4 | 960 | 46 | 45 |
| 10 | 51 | Imm | 5 | 1,420 | 45 | 44 |
| Average | | | | 1,190 | | |
| 11 | 51 | Cont | 4 | 1,610 | 45 | 44 |
| 12 | 51 | Cont | 4 | 1,520 | 45 | 45 |
| Average | | | | 1,565 | | |
| 13 | 44 | Imm | 6 | 620 | 45 | 44 |
| 14 | 44 | Imm | 6 | 560 | 46 | 44 |
| Average | | | | 590 | | |
| 15 | 44 | Cont | 6 | 1,200 | 46 | 44 |
| 16 | 44 | Cont | 6 | 1,290 | 46 | 45 |
| Average | | | | 1,245 | | |

[1] Specimens 1, 2, 7 and 8 used a 28-mesh stainless steel space screen as a carrier. All other specimens used no carrier.

What is claimed is:

1. A ceramic adhesive composition consisting essentially of a mixture of the following constituents in approximately the following parts by weight:

| | |
|---|---|
| Ceramic frit | 60–70 |
| Suspending agent | 1–2 |
| Water | 25–35 |
| Metal powder selected from the group consisting of aluminum, copper, carbonyl iron, carbonyl nickel and silicon | 5–20 | in which said ceramic frit consists essentially of the following materials in approximately the following parts by weight:

| | |
|---|---|
| $SiO_2$ | 23–28 |
| $Al_2O_3$ | 10–15 |
| $B_2O_3$ | 3–6 |
| $Na_2O$ | 10–20 |
| $K_2O$ | 3–6 |
| $BaO$ | 4–7 |
| $ZnO$ | 8–12 |
| $CaO$ | 4–6 |
| $Na_2SiF_6$ | 4–6 |
| $P_2O_5$ | 1–5 |
| $Cr_2O_3$ | 0–5 |
| $Fe_2O_3$ | 0–5 |
| $V_2O_5$ | 1–4 |

2. A ceramic adhesive composition consisting essentially of a mixture of the following constituents in approximately the following parts by weight:

| | |
|---|---|
| Ceramic frit | 60–70 |
| Suspending agent | 1–2 |
| Water | 25–35 |
| Metal powder selected from the group consisting of aluminum, copper, carbonyl iron, carbonyl nickel and silicon | 5–20 | in which said ceramic frit consists essentially of the following materials in approximately the following parts by weight:

| | |
|---|---|
| $SiO_2$ | 37–43 |
| $B_2O_3$ | 50–60 |
| $Na_2O$ | 3–7 |

3. A ceramic adhesive as defined in claim 1 in which said ceramic frit consists essentially of the following materials in approximately the following parts by weight:

| | |
|---|---|
| $SiO_2$ | 27.2 |
| $Na_2O$ | 16.3 |
| $B_2O_3$ | 4.0 |
| $Al_2O_3$ | 13.0 |
| $K_2O$ | 5.1 |
| $BaO$ | 6.0 |
| $CaO$ | 5.4 |
| $ZnO$ | 11.0 |
| $Na_2SiF_6$ | 5.0 |
| $P_2O_5$ | 4.0 |
| $V_2O_5$ | 3.0 |

4. A ceramic adhesive as defined in claim 1 in which said ceramic frit consists essentially of the following materials in approximately the following parts by weight:

| | |
|---|---|
| $SiO_2$ | 26.7 |
| $Na_2O$ | 16.0 |
| $B_2O_3$ | 3.9 |
| $Al_2O_3$ | 12.7 |
| $K_2O$ | 5.0 |
| $BaO$ | 5.9 |
| $CaO$ | 5.3 |
| $ZnO$ | 10.8 |
| $Na_2SiF_6$ | 4.9 |
| $P_2O_5$ | 3.9 |
| $V_2O_5$ | 2.9 |
| $Cr_2O_3$ | 2.0 |

5. A ceramic adhesive as defined in claim 2 in which said ceramic frit consists essentially of the following materials in approximately the following parts by weight:

| | |
|---|---|
| $SiO_2$ | 38.0 |
| $Na_2O$ | 5.0 |
| $B_2O_3$ | 57.0 |

6. A ceramic adhesive composition consisting essentially of a mixture of the following constituents in approximately the following parts by weight:

| | |
|---|---|
| Ceramic frit | 65.8 |
| Colloidal silica | 1.3 |
| Water | 32.9 |
| Metal powder selected from the group consisting of aluminum, copper, carbonyl iron, carbonyl nickel and silicon | 5–20 | in which said ceramic frit consists essentially of the following materials in approximately the following parts by weight:

| | |
|---|---|
| $SiO_2$ | 27.2 |
| $Na_2O$ | 16.3 |
| $B_2O_3$ | 4.0 |
| $Al_2O_3$ | 13.0 |
| $K_2O$ | 5.1 |
| $BaO$ | 6.0 |
| $CaO$ | 5.4 |
| $ZnO$ | 11.0 |
| $Na_2SiF_6$ | 5.0 |
| $P_2O_5$ | 4.0 |
| $V_2O_5$ | 3.0 |

7. A ceramic adhesive as defined in claim 6 in which said metal powder consists essentially of 5 parts by weight of aluminum.

8. A ceramic adhesive as defined in claim 6 in which said metal powder consists essentially of 5 parts by weight of copper.

9. A ceramic adhesive as defined in claim 6 in which said metal powder consists essentially of 5 parts by weight of carbonyl iron.

10. A ceramic adhesive as defined in claim 6 in which said metal powder consists essentially of 5 parts by weight of carbonyl nickel.

11. A ceramic adhesive as defined in claim 6 in which said metal powder consists essentially of 5 parts by weight of silicon.

12. A ceramic adhesive as defined in claim 6 in which said metal powder consists essentially of 10 parts by weight of carbonyl iron.

13. A ceramic adhesive as defined in claim 6 in which said metal powder consists essentially of 20 parts by weight of carbonyl iron.

14. A ceramic adhesive composition consisting essentially of a mixture of the following constituents in approximately the following parts by weight:

| | |
|---|---|
| Ceramic frit | 65.8 |
| Colloidal silica | 1.3 |
| Water | 32.9 |
| Metal powder selected from the group consisting of aluminum, copper, carbonyl iron, carbonyl nickel and silicon | 5–20 | in which said ceramic frit consists essentially of the following materials in approximately the following parts by weight:

| | |
|---|---|
| $SiO_2$ | 26.7 |
| $Na_2O$ | 16.0 |
| $B_2O_3$ | 3.9 |
| $Al_2O_3$ | 12.7 |
| $K_2O$ | 5.0 |
| $BaO$ | 5.9 |
| $CaO$ | 5.3 |
| $ZnO$ | 10.8 |
| $Na_2SiF_6$ | 4.9 |
| $P_2O_5$ | 3.9 |
| $V_2O_5$ | 2.9 |
| $Cr_2O_3$ | 2.0 |

15. A ceramic adhesive as defined in claim 14 in which said metal powder consists essentially of 5 parts by weight of aluminum.

16. A ceramic adhesive as defined in claim 14 in which said metal powder consists essentially of 5 parts by weight of copper.

17. A ceramic adhesive as defined in claim 14 in which said metal powder consists essentially of 5 parts by weight of carbonyl iron.

18. A ceramic adhesive as defined in claim 14 in which said metal powder consists essentially of 5 parts by weight of carbonyl nickel.

19. A ceramic adhesive as defined in claim 14 in which said metal powder consists essentially of 5 parts by weight of silicon.

20. A ceramic adhesive as defined in claim 14 in which said metal powder consists essentially of 10 parts by weight of carbonyl iron.

21. A ceramic adhesive as defined in claim 14 in which said metal powder consists essentially of 20 parts by weight of carbonyl iron.

22. A ceramic adhesive composition consisting essentially of a mixture of the following constituents in approximately the following parts by weight:

| | |
|---|---|
| Ceramic frit | 70.4 |
| Colloidal silica | 1.4 |
| Water | 28.2 |
| Metal powder selected from the group consisting of aluminum, copper, carbonyl iron, carbonyl nickel and silicon | 5–20 | in which said ceramic frit consists essentially of the following materials in approximately the following parts by weight:

| | |
|---|---|
| $SiO_2$ | 38.0 |
| $Na_2O$ | 5.0 |
| $B_2O_3$ | 57.0 |

23. A ceramic adhesive as defined in claim 22 in which said metal powder consists essentially of 5 parts by weight of carbonyl iron.

24. A ceramic adhesive as defined in claim 22 in which said metal powder consists essentially of 10 parts by weight of carbonyl iron.

25. A ceramic adhesive as defined in claim 22 in which said metal powder consists essentially of 20 parts by weight of carbonyl iron.

References Cited by the Examiner

UNITED STATES PATENTS

| | | | |
|---|---|---|---|
| 2,250,457 | 7/41 | Bahnsen et al. | 106—48 |
| 2,706,692 | 4/55 | Chester | 106—48 |
| 2,857,292 | 10/58 | Moore | 106—48 |
| 2,882,187 | 4/59 | Kwate | 106—49 |
| 2,898,236 | 8/59 | Long et al. | 106—48 |
| 3,014,816 | 12/61 | King et al. | 106—48 |
| 3,041,201 | 6/62 | Roelofs | 117—70 |
| 3,061,482 | 10/62 | Grant | 75—206 |
| 3,069,759 | 12/62 | Grant et al. | 29—182.5 |

FOREIGN PATENTS 666,637  2/52  Great Britain.

OTHER REFERENCES

Eckhoff: German application 1,093,165, printed Nov. 17, 1960 (KL 48 cl), 1 page spec.

TOBIAS E. LEVOW, *Primary Examiner.*

JOSEPH REBOLD, *Examiner.*